US 7,510,285 B2

(12) United States Patent
Takemi et al.

(10) Patent No.: US 7,510,285 B2
(45) Date of Patent: Mar. 31, 2009

(54) PROJECTOR

(75) Inventors: Kazutoshi Takemi, Daito (JP); Masaki Ochi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 487 days.

(21) Appl. No.: 11/344,213

(22) Filed: Feb. 1, 2006

(65) Prior Publication Data

US 2006/0170876 A1    Aug. 3, 2006

(30) Foreign Application Priority Data

Feb. 2, 2005    (JP)    ............................. 2005-026948

(51) Int. Cl.
G03B 21/16    (2006.01)
G03B 21/18    (2006.01)
G03B 21/26    (2006.01)
B60Q 1/06    (2006.01)
F21V 29/00    (2006.01)

(52) U.S. Cl. ............................. 353/61; 353/57; 362/373

(58) Field of Classification Search .................... 353/57, 353/58, 59, 60, 61, 119, 122, 85; 362/373, 362/294, 345; 352/202; 348/748
See application file for complete search history.

(56) References Cited

U.S. PATENT DOCUMENTS

| | | | |
|---|---|---|---|
| 6,398,366 B1 | 6/2002 | Hara et al. | |
| 6,443,575 B1 | 9/2002 | Miyamoto et al. | |
| 6,641,267 B2 * | 11/2003 | Ohishi et al. | ................... 353/61 |
| 2004/0169825 A1 * | 9/2004 | Ozawa et al. | ................. 353/61 |

FOREIGN PATENT DOCUMENTS

| | | |
|---|---|---|
| JP | 08-022075 A | 1/1996 |
| JP | 2000-330202 A | 11/2000 |
| JP | 2001-133885 A | 5/2001 |
| JP | 2001-183746 A | 7/2001 |

OTHER PUBLICATIONS

Japanese Office Action dated Dec. 20, 2007 with an English translation (Six (6) pages).

* cited by examiner

*Primary Examiner*—William C Dowling
*Assistant Examiner*—Ryan Howard
(74) *Attorney, Agent, or Firm*—Crowell & Moring LLP

(57) ABSTRACT

A projector capable of efficiently cooling a source lamp with single air feed means is obtained. This projector comprises a source lamp, an optical component arranged on a position irradiated with light from the source lamp, air feed means for feeding air toward the source lamp, a first air guide member for guiding the air fed from the air feed means at least toward the optical component and a second air guide member for guiding the air guided toward the optical component to pass through the optical component toward the source lamp.

13 Claims, 7 Drawing Sheets

PROJECTOR

BACKGROUND OF THE INVENTION

1. Field of the Invention

The present invention relates to a projector, and more particularly, it relates to a projector comprising a structure for cooling a source lamp.

2. Description of the Background Art

Various projectors comprising structures for cooling source lamps are proposed in general. For example, Japanese Patent Laying-Open Nos. 2000-330202 and 8-22075 (1995) disclose such projectors.

The aforementioned Japanese Patent Laying-Open No. 2000-330202 discloses a projective display (projector) discharging air, externally fed by a cooling suction fan (air feed means) through vent holes formed on the bottom surface of a housing to pass through optical units, to an exhaust fan arranged at the back of a source lamp. In this projector disclosed in Japanese Patent Laying-Open No. 2000-330202, the air flows through a path passing through the optical units to directly reach the exhaust fan, another path passing through the source lamp as well as an exhaust port formed at the back of the source lamp via vent holes formed in front of a lamp housing storing the source lamp from the optical units to reach the exhaust fan and still another path passing through a power supply unit via an auxiliary suction fan mounted on an end of the power supply unit from the optical units to reach the exhaust fan.

The aforementioned Japanese Patent Laying-Open No. 8-22075 discloses a projector, comprising a light source (source lamp) formed by a convex mirror and a light-emitting portion, feeding air introduced from a suction fan (air feed means) into a lamp house (lamp case) storing the light source through vent holes formed on the lamp house for forming reflux toward the center of the concavity of the concave mirror, thereby cooling the light emitting portion arranged at the center of the concavity.

A projector comprising a structure for cooling a source lamp and optical components is also known in general. The structure of an exemplary conventional projector of this type is described with reference to FIGS. 7 to 9.

As shown in FIG. 7, the exemplary conventional projector comprises a front frame 101, a rear frame 102, an upper frame 103 and a lower frame 104. A lens receiving portion 101a receiving a projection lens 105 for projecting images is formed on a part closer to an end (along arrow A) of the front frame 101. Exhaust slots 101b are provided on a part located between the center and the other end (along arrow B) of the front frame 101, as shown in FIGS. 7 and 8.

Intake ports 104a for introducing air are provided on a first side surface (along arrow A) of the lower frame 104 while exhaust slots 104b for discharging air are provided on a second side surface (along arrow B) thereof, as shown in FIG. 8. An exhaust fan 106 is arranged inside the exhaust slots 104b, for discharging air from the projector. A main switch 107 is provided on the first side surface (along arrow A) of the lower frame 104.

A lamp case 108 is set in the lower frame 104. A plurality of openings 108b are provided on side surfaces 108a of the lamp case 108, as shown in FIG. 9. Protection nets 109 are mounted on a group of the openings 108b provided along arrow A. These protection nets 109 have a function of preventing fragments of a source lamp 110 arranged in the lamp case 108 from scattering outward when the source lamp 110 is broken due to excessive temperature rise. The source lamp 110 arranged in the lamp case 108 comprises a bulb 110a serving as a light source and a reflector 110b for reflecting and condensing light emitted from the bulb 110a, as shown in FIG. 8.

The lower frame 104 is provided with a temperature control fan 111 for controlling the temperature of the source lamp 110 by guiding air to the source lamp 110.

An engine chassis 112 is set in the lower frame 104. A color wheel 113 is rotatably arranged on a position of the engine chassis 112 condensing the light emitted from the bulb 110a of the source lamp 110. This color wheel 113 has a function of coloring the light emitted from the source lamp 110. A light tunnel 114 for rectangularly shaping the light is mounted on the color wheel 113 along arrow A. This light tunnel 114 has an inlet 114a receiving the light from the source lamp 110 and an outlet 114b discharging the received light.

A transmission member 115 transmitting the light shaped by the light tunnel 114 is mounted on the engine chassis 112 in the vicinity of the outlet 114b of the light tunnel 114. A cooling fan 116 is set on the side of the light tunnel 114 and the transmission member 115, adjacently to the temperature control fan 111.

A mirror 117 for reflecting the light transmitted through the transmission member 115 is set in the engine chassis 112. A DMD (digital micromirror device) 118 for further reflecting the light reflected by the mirror 117 and supplying the same to the projection lens 105 is provided on the outer side of the engine chassis 112. A lens 119 is provided between the DMD 118 and the mirror 117. This lens 119 has a function of condensing the light reflected by the mirror 117 to reflecting portions of the DMD 118. The DMD 118 is mounted on a printed board 120 for controlling the same. A heat sink member 121 for releasing heat from the DMD 118 is mounted on the printed board 120. A main substrate 122 for controlling the projector is arranged on the lower frame 104.

Operations of the exemplary conventional projector are now described with reference to FIG. 8. First, the light emitted from the bulb 110a of the source lamp 110 is condensed by the reflector 110b of the source lamp 110, colored by the color wheel 113 and introduced into the inlet 114a of the light tunnel 114, as shown in FIG. 8. Thereafter the light introduced into the inlet 114a of the light tunnel 114 is rectangularly shaped, to outgo from the outlet 114b of the light tunnel 114. The light outgoing from the outlet 114b of the light tunnel 114 advances along arrow C and passes through the transmission member 115, to enter the mirror 117. The mirror 117 reflects this light along arrow D. The light reflected by the mirror 117 enters the DMD 118 through the lens 119. The DMD 118 reflects this light along arrow E, for supplying the same to the projection lens 105. Thus, the projection lens 105 projects images on a screen or the like.

In the aforementioned operations of the projector, the exhaust fan 106, the temperature control fan 111 and the cooling fan 116 are so rotated as to introduce air through the intake ports 104a of the lower frame 104. First, the cooling fan 116 is so rotated as to guide part of the air introduced through the intake ports 104a toward the color wheel 113 and the light tunnel 114 along arrow F in FIG. 8. The partial air guided toward the color wheel 113 and the light tunnel 114 passes through the color wheel 113 and the light tunnel 114, and is thereafter discharged through the exhaust slots 101b of the front frame 101. Thus, the color wheel 113 and the light tunnel 114 are cooled.

The temperature control fan 111 is so rotated as to feed another part of the air introduced through the intake ports 104a into the lamp case 108 through the openings 108b (see FIG. 9) along arrow G in FIG. 8. Thus, the partial air fed into the lamp case 108 passes through the source lamp 110 arranged in the lamp case 108, and is thereafter discharged from the exhaust slots 101b of the front frame 101 through the openings 108b of the lamp case 108. Consequently, the source lamp 110 is controlled to a prescribed temperature.

The exhaust fan 106 is so rotated as to discharge still another part of the air introduced through the intake ports 104a from the exhaust slots 104b of the lower frame 104 through the main substrate 122 along arrows H and I in FIG. 8. Thus, the main substrate 122 is cooled.

However, the conventional projector shown in FIGS. 7 to 9 must disadvantageously be provided with the temperature control fan 111 and the cooling fan 116, in order to cool the source lamp 110 as well as the color wheel 113 and the light tunnel 114. Consequently, the number of the fans (air feed means) for cooling the source lamp 110 and the optical components such as the color wheel 113 and the light tunnel 114 is disadvantageously increased.

In the aforementioned projective display disclosed in Japanese Patent Laying-Open No. 2000-330202, on the other hand, air not increased in temperature is disadvantageously discharged from the display due to the path guiding the air fed from the cooling suction fan directly to the exhaust fan through the optical units. Therefore, it is disadvantageously difficult to efficiently cool the source lamp with the air introduced through the cooling suction fan.

In the aforementioned projector disclosed in Japanese Patent Laying-Open No. 8-22075, air fed through the suction fan is introduced into the lamp house through the vent holes of the lamp house storing the light source. Therefore, this projector requires an additional fan (air feed means) independent of the suction fan in order to cool optical components arranged on a position irradiated with the light from the light source, although this is not described in the aforementioned gazette. Consequently, the number of fans (air feed means) for cooling the light source and the optical components is disadvantageously increased.

SUMMARY OF THE INVENTION

The present invention has been proposed in order to solve the aforementioned problems, and an object of the present invention is to provide a projector capable of efficiently cooling a source lamp with single air feed means.

In order to attain the aforementioned object, a projector according to a first aspect of the present invention comprises a source lamp, an optical component arranged on a position irradiated with light from the source lamp, air feed means for feeding air toward the source lamp, a first air guide member for guiding the air fed from the air feed means at least toward the optical component and a second air guide member for guiding the air guided toward the optical component to pass through the optical component toward the source lamp.

The projector according to the first aspect, provided with the first air guide member for guiding the air fed from the air feed means at least toward the optical component and the second air guide member for guiding the air guided toward the optical component to pass through the optical component toward the source lamp as hereinabove described, can guide the air toward the source lamp and toward the optical component respectively with the single air feed means. Thus, no air feed means may be individually arranged for cooling the source lamp and the optical component respectively, whereby the number of air feed means can be inhibited from increase also when cooling the source lamp and the optical component respectively. Further, the projector is so provided with the second air guide member for guiding the air guided toward the optical component to pass through the optical component toward the source lamp that the air employed for cooling the optical component can be guided toward the source lamp again. Thus, the air employed for cooling the optical component can be recycled for efficiently cooling the source lamp.

In the aforementioned projector according to the first aspect, the first air guide member preferably includes a first air guide portion for guiding the air fed from the air feed means to the source lamp and a second air guide portion for guiding the air to the optical component. According to this structure, the air fed from the air feed means can be easily branched toward the source lamp and toward the optical member respectively. Thus, the source lamp and the optical component can be easily cooled with the single air feed means.

In the aforementioned projector comprising the first air guide member including the first air guide portion, the air introduced into the source lamp by the second air guide member is preferably so fed as to guide the air fed from the air feed means to the source lamp through the first air guide portion of the first air guide member toward the back of the source lamp. According to this structure, the back portion of the source lamp can be cooled.

The aforementioned projector comprising the first air guide member including the first air guide portion preferably further comprises a lamp case mounted therein with the source lamp and formed to enclose the source lamp for preventing the source lamp from leaking light, and the lamp case is preferably formed with a first air guide hole for introducing the air fed from the first air guide portion of the first air guide member, a second air guide hole for introducing the air fed from the second air guide member and a third air guide hole for discharging the air guided toward the back of the light source from the lamp case. According to this structure, the source lamp can be cooled by introducing the air fed from the first air guide member through the first air guide hole while introducing the air fed from the second air guide member through the second air guide hole also when the temperature in the lamp case is increased due to heat generation in the source lamp enclosed with the lamp case. In this case, the third air guide hole for discharging the air guided toward the back of the light source from the lamp case is so provided as to ensure a path for discharging hot air increased in temperature by cooling the source lamp. Consequently, the lamp case storing the source lamp can be inhibited from confining the heat therein.

In this case, the first air guide portion of the first air guide member is preferably connected to the first air guide hole of the lamp case, and the second air guide member is preferably connected to the second air guide hole of the lamp case. According to this structure, the air flowing through the first air guide portion of the first air guide member can be easily guided into the lamp case, while the air flowing through the second air guide member can also be easily guided into the lamp case.

The aforementioned projector according to the first aspect preferably further comprises a housing, while the housing is preferably integrally provided with a partition for guiding air to the air feed means, the first air guide member is preferably integrally formed on the housing or the partition, and the second air guide member is preferably integrally formed on the housing. According to this structure, the number of components can be inhibited from increase despite the provision of the partition. Further, the first air guide member is integrally formed on the partition integrally provided on the housing while the second air guide member is integrally formed on the housing so that the number of components can be inhibited from increase despite the provision of the first and second air guide members.

In the aforementioned projector according to the first aspect, the second air guide member preferably includes an intake port for introducing the air passing through the optical component and an inlet introducing the air received through the intake port into the source lamp. According to this structure, the air introduced through the intake port can be easily guided to the source lamp through the inlet.

In the aforementioned projector comprising the first air guide member including the first air guide portion, the source lamp preferably includes a bulb and a reflecting member for reflecting and condensing light emitted from the bulb, and the first air guide portion of the first air guide member is preferably arranged to guide the air fed by the same along the inner surface of the reflecting member. According to this structure, the reflecting member can be easily cooled also when the temperature thereof is increased due to heat generation in the bulb since the air fed from the first air guide portion of the first air guide member flows along the inner surface of the reflecting member.

In the aforementioned projector comprising the first air guide member including the second air guide portion, the second air guide portion of the first air guide member preferably includes an outlet for discharging the air fed from the air feed means, the second air guide member preferably includes an intake port for introducing the air passing through the optical component, and the outlet of the second air guide portion of the first air guide member and the intake port of the second air guide member are preferably opposed to each other through the optical component. According to this structure, the air fed from the outlet of the second air guide portion of the first air guide member can be easily guided to the intake port of the second air guide member. Thus, the air fed from the outlet of the second air guide member is guided to the intake port of the second air guide member after cooling the optical component, whereby the air employed for cooling the optical component can be guided toward the source lamp. Consequently, the air employed for cooling the optical component can be recycled for efficiently cooling the source lamp.

A projector according to a second aspect of the present invention comprises a housing of resin, a source lamp, an optical component arranged on a position irradiated with light from the source lamp, a blower for feeding air toward the source lamp and a lamp case mounted therein with the source lamp, while the housing is integrally formed with a partition for guiding air to the blower, a first duct for branching the air fed from the blower toward the source lamp and toward the optical component respectively and a second duct for guiding the air guided toward the optical component to pass through the optical component toward the source lamp, the first duct is integrally formed on the partition of the housing, the air introduced into the source lamp through the second duct is so fed as to guide the air fed from the blower to the source lamp through the first duct toward the back of the source lamp, and the lamp case is formed to enclose the source lamp for preventing the source lamp from leaking light and includes a first air guide hole for introducing the air fed from the first duct, a second air guide hole for introducing the air fed from the second duct and a third air guide hole for discharging the air guided toward the back of the source lamp from the lamp case.

The projector according to the second aspect, provided with the first duct for branching the air fed from the blower toward the source lamp and toward the optical component respectively and the second duct for guiding the air guided toward the optical component to pass through the optical component toward the source lamp as hereinabove described, can guide the air toward the source lamp and toward the optical component respectively with the single blower. Thus, no blowers may be individually arranged for cooling the source lamp and the optical component respectively, whereby the number of the blower can be inhibited from increase also when cooling the source lamp and the optical component respectively. Further, the projector is so provided with the second duct for guiding the air guided toward the optical component to pass through the optical component toward the source lamp that the air employed for cooling the optical component can be guided toward the source lamp again. Thus, the air employed for cooling the optical component can be recycled for efficiently cooling the source lamp. Further, the back portion of the source lamp can be cooled by guiding the air fed from the blower to the source lamp through the first duct toward the back of the source lamp with the air introduced into the source lamp through the second duct. In addition, the lamp case is formed with the first and second air guide holes for introducing the air fed from the first and second ducts respectively, so that the source lamp can be cooled by introducing the air fed from the first duct through the first air guide hole while introducing the air fed from the second duct through the second air guide hole also when the temperature in the lamp case is increased due to heat generation in the source lamp enclosed with the lamp case. In this case, the third air guide hole for discharging the air guided toward the back of the light source from the lamp case is so provided as to ensure a path for discharging hot air increased in temperature by cooling the source lamp. Consequently, the lamp case storing the source lamp can be inhibited from confining the heat therein. Further, the partition for guiding the air to the blower is so integrally provided on the housing that the number of components can be inhibited from increase despite the provision of the partition. In addition, the first duct is integrally formed on the partition integrally provided on the housing while the second duct is integrally formed on the housing, so that the number of components can be inhibited from increase despite the provision of the first and second ducts.

In the aforementioned projector according to the second aspect, the first duct preferably includes a first air guide portion for guiding the air fed from the blower to the source lamp and a second air guide portion for guiding the air to the optical component. According to this structure, the air fed from the blower can be easily branched toward the source lamp and the optical member respectively. Thus, the source lamp and the optical component can be easily cooled with the single blower.

In the aforementioned projector comprising the first duct including the first air guide portion, the first air guide portion of the first duct is preferably connected to the first air guide hole of the lamp case, and the second duct is preferably connected to the second air guide hole of the lamp case. According to this structure, the air flowing through the first air guide portion of the first duct can be easily guided into the lamp case, while the air flowing through the second duct can also be easily guided into the lamp case.

In the aforementioned projector according to the second aspect, the second duct preferably includes an intake port for introducing the air passing through the optical component and an inlet introducing the air received through the intake port into the source lamp. According to this structure, the air introduced through the intake port can be easily guided to the source lamp through the inlet.

In the aforementioned projector comprising the first duct including the first air guide portion, the source lamp preferably includes a bulb and a reflecting member for reflecting and condensing light emitted from the bulb, and the first air guide portion of the first duct is preferably arranged to guide the air fed by the same along the inner surface of the reflecting member. According to this structure, the reflecting member can be easily cooled also when the temperature thereof is increased due to heat generation in the bulb since the air fed from the first air guide portion of the first duct flows along the inner surface of the reflecting member.

In the aforementioned projector comprising the first duct including the second air guide portion, the second air guide portion of the first duct preferably includes an outlet for discharging the air fed from the blower, the second duct preferably includes an intake port for introducing the air passing through the optical component, and the outlet of the second air guide portion of the first duct and the intake port of the second duct are preferably opposed to each other through the optical component. According to this structure, the air fed from the outlet of the second air guide portion of the first duct can be easily guided to the intake port of the second duct. Thus, the air fed from the outlet of the second air guide portion is guided to the intake port of the second duct after cooling the optical component, whereby the air employed for cooling the optical component can be guided toward the source lamp. Consequently, the air employed for cooling the optical component can be recycled for efficiently cooling the source lamp.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

The structure of a projector according to the embodiment of the present invention is described with reference to FIGS. 1 to 6.

Figure 1:
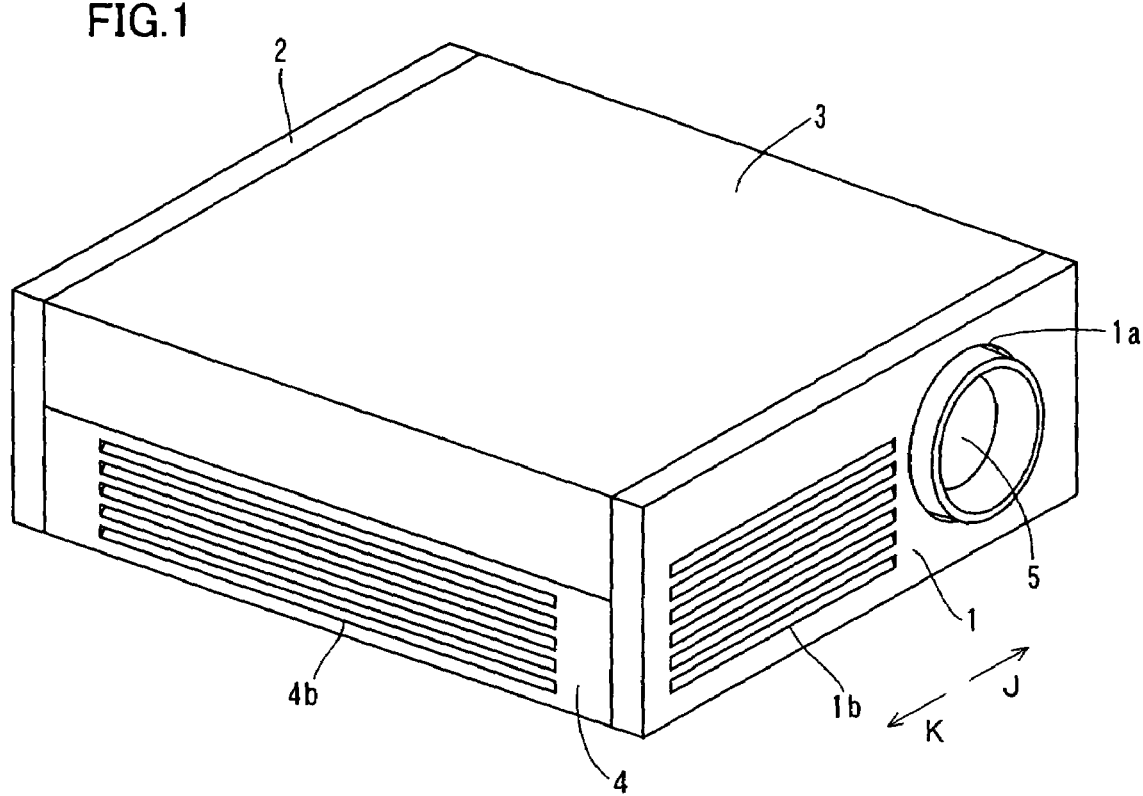
FIG. 1 is a perspective view showing the overall structure of a projector according to an embodiment of the present invention.

As shown in FIG. 1, the projector according to the embodiment of the present invention comprises a front frame 1, a rear frame 2, an upper frame 3 and a lower frame 4. The lower frame 4 is an example of the "housing" in the present invention. A lens receiving portion 1a receiving a projection lens 5 for projecting images is formed on a part closer to an end (along arrow J) of the front frame 1. Exhaust slots 1b are provided on a part located between the center and the other end (along arrow K) of the front frame 1, as shown in FIGS. 1 and 2.

Figure 2:
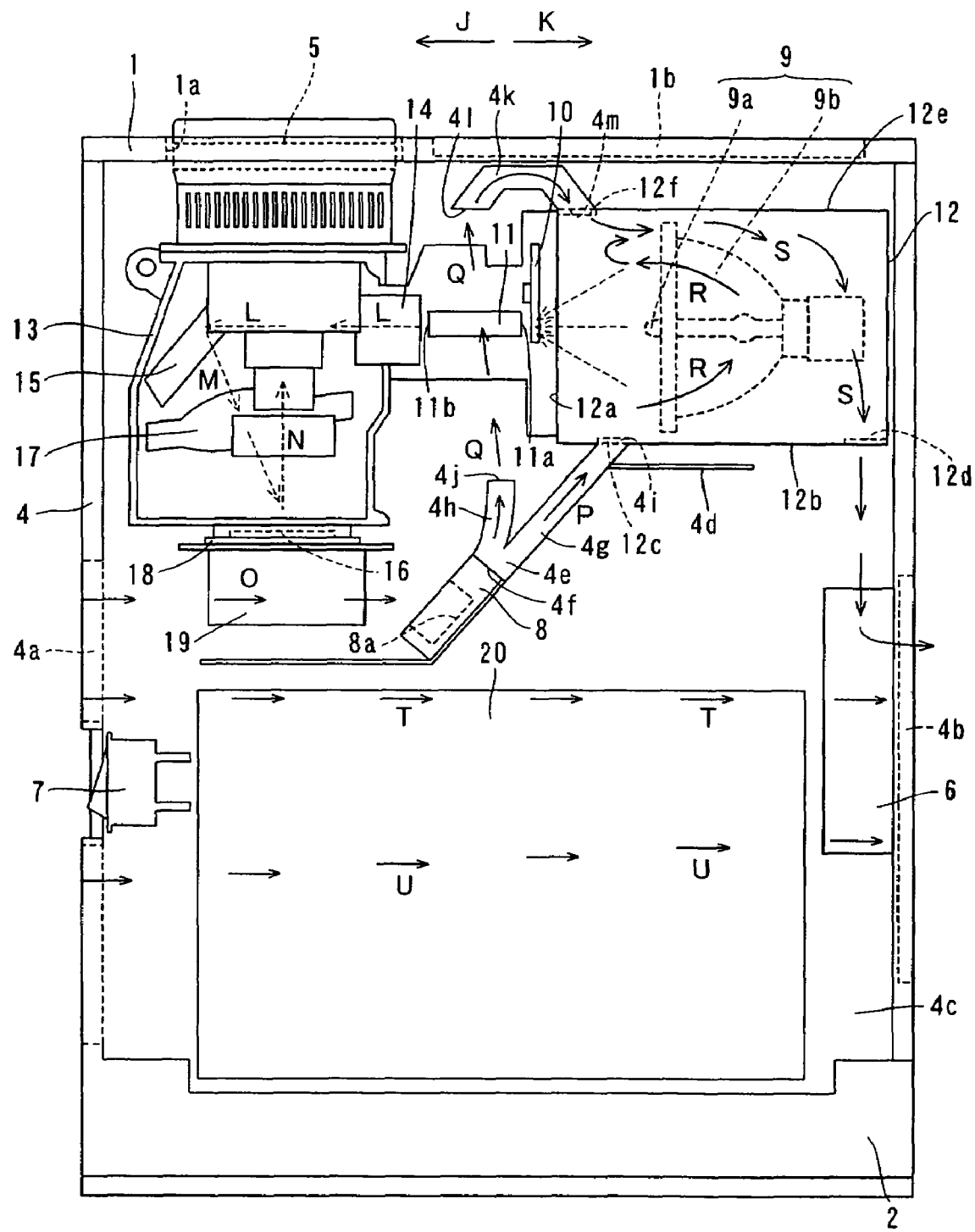
FIG. 2 is a plan view of the projector according to the embodiment of the present invention shown in FIG. 1.

Intake ports 4a for introducing air are provided on a first side surface (along arrow J) of the lower frame 4 while exhaust slots 4b for discharging air are provided on a second side surface (along arrow K) thereof, as shown in FIG. 2. An exhaust fan 6 is arranged inside the exhaust slots 4b for discharging air from the projector. A main switch 7 is provided on the first side surface (along arrow J) of the lower frame 4.

Figure 3:
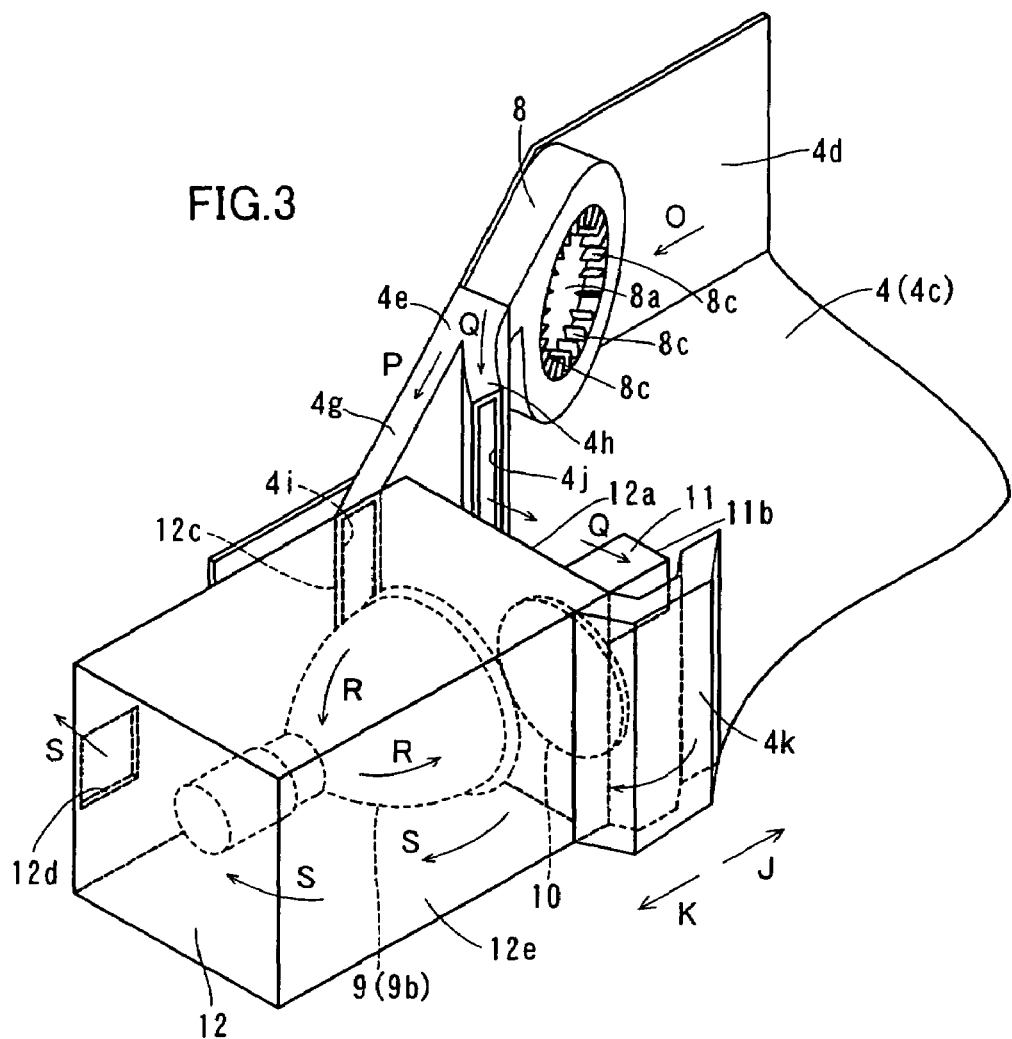
FIG. 3 is a perspective view of a source lamp and a blower of the projector according to the embodiment of the present invention shown in FIG. 1.
Figure 6:
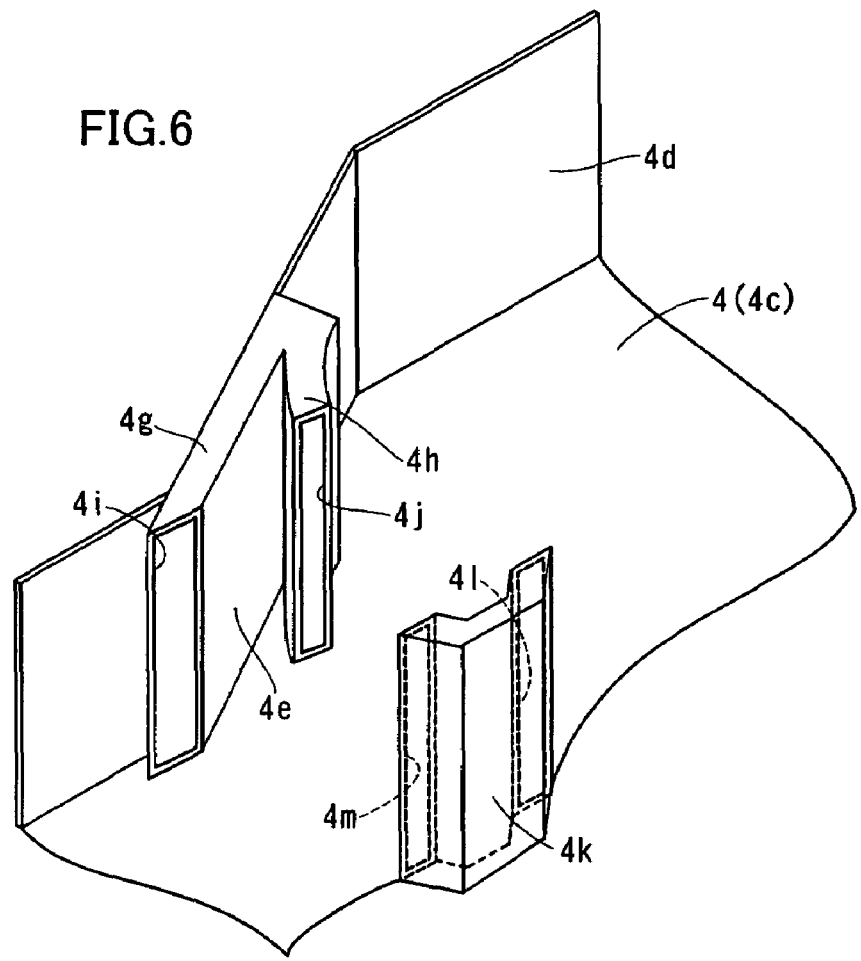
FIG. 6 is a perspective view of ducts of the projector according to the embodiment of the present invention shown in FIG. 1.
Figure 7:
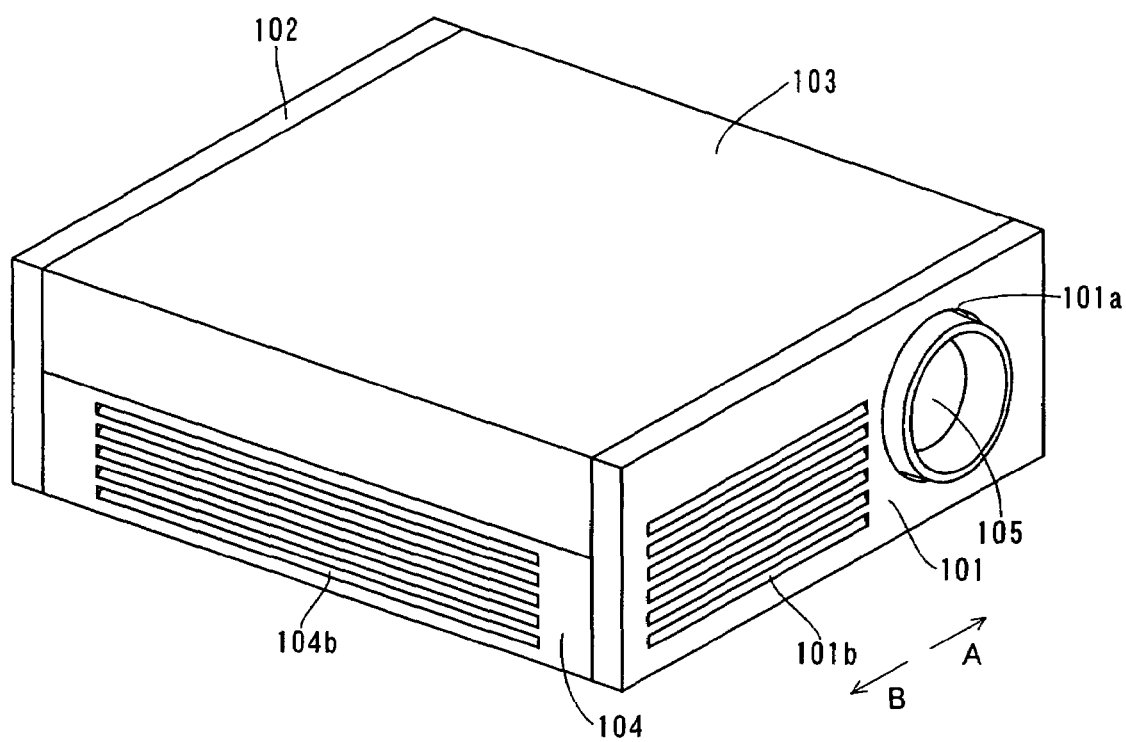
FIG. 7 is a perspective view showing the overall structure of an exemplary conventional projector.
Figure 8:
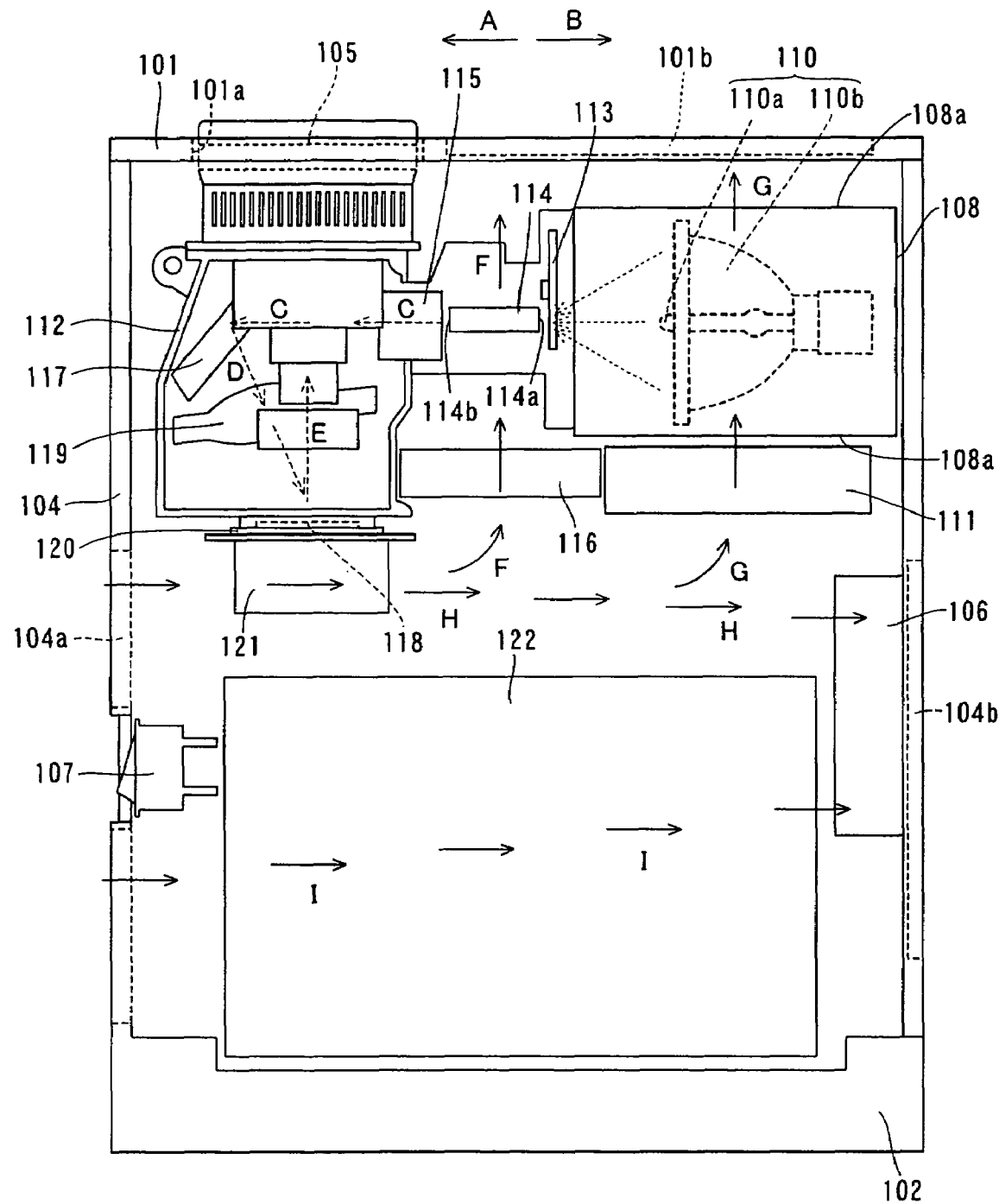
FIG. 8 is a plan view of the conventional projector shown in FIG. 7.

According to this embodiment, a partition 4d is integrally provided on the lower frame 4 to extend upward from the bottom surface 4c of the lower frame 4, as shown in FIGS. 2, 3 and 6. A blower 8 (see FIG. 3) is arranged along the partition 4d. The blower 8 is an example of the "air feed means" in the present invention. The partition 4d is provided for guiding air fed through the intake ports 4a of the lower frame 4 to the blower 8. The partition 4d is integrally formed with a duct 4e for branching the air fed from the blower 8. This duct 4e is formed along the partition 4d. The duct 4e is an example of the "first duct" or the "first air guide member" in the present invention. The duct 4e is provided with an air guide hole 4f for introducing the air fed from the blower 8, an air guide portion 4g for guiding the air toward a source lamp 9 described later and another air guide portion 4h for guiding the air toward a color wheel 10 and a light tunnel 11. The color wheel 10 and the light tunnel 11 are examples of the "optical component" in the present invention. The air guide portion 4g is so arranged as to guide the air fed by the same along the inner surface of a reflector 9b of the source lamp 9 described later. The air guide portions 4g and 4h of the duct 4e are provided with outlets 4i and 4j for discharging the air fed through the air guide hole 4f. The outlet 4i of the air guide portion 4g is connected to an air guide hole 12c of a lamp case 12 described later. Another duct 4k is integrally provided on the lower frame 4 for guiding the air passing through the color wheel 10 and the light tunnel 11 toward the source lamp 9. The duct 4k is an example of the "second duct" or the "second air guide member" in the present invention. This duct 4k is provided with an air guide hole 4l for introducing the air passing through the color wheel 10 and the light tunnel 11 and an outlet 4m for guiding this air toward the source lamp 9. The air guide hole 4l of the duct 4k is opposed to the outlet 4j of the air guide portion 4h of the duct 4e through the light tunnel 11. The outlet 4m of the duct 4k is connected to another air guide hole 12f of the lamp case 12 described later.

Figure 5:
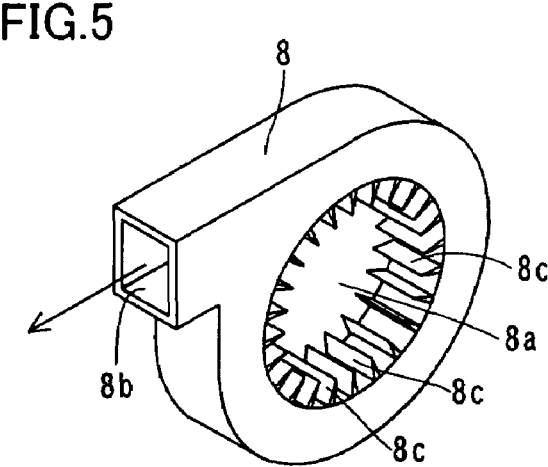
FIG. 5 is a perspective view of the blower of the projector according to the embodiment of the present invention shown in FIG. 1.

As shown in FIG. 5, the blower 8 is provided with an air inlet 8a for introducing air and an air outlet 8b for feeding the air introduced through the air inlet 8a. A plurality of vanes 8c are rotatably mounted on the air inlet 8a. The plurality of vanes 8c are rotated for introducing the air through the air inlet 8a and feeding this air through the air outlet 8b.

As shown in FIG. 2, the source lamp 9 comprises a bulb 9a of glass serving as a light source and the reflector 9b of metal for reflecting and condensing light emitted from the bulb 9a. This source lamp 9 is mounted in the boxlike lamp case 12.

The front surface 12a of the lamp case 12 is made of LCP resin (liquid crystal polyester resin or liquid crystal polymer resin) (heatproof temperature: about 340° C. to about 350° C.) while the remaining portion thereof is made of PPS resin (polyphenylene sulfide resin) (heatproof temperature: about 240° C.).

Figure 4:
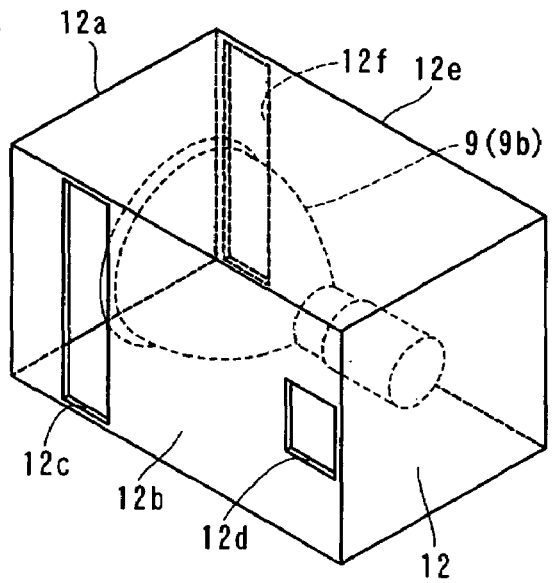
FIG. 4 is a perspective view of a lamp case of the projector according to the embodiment of the present invention shown in FIG. 1.
Figure 9:
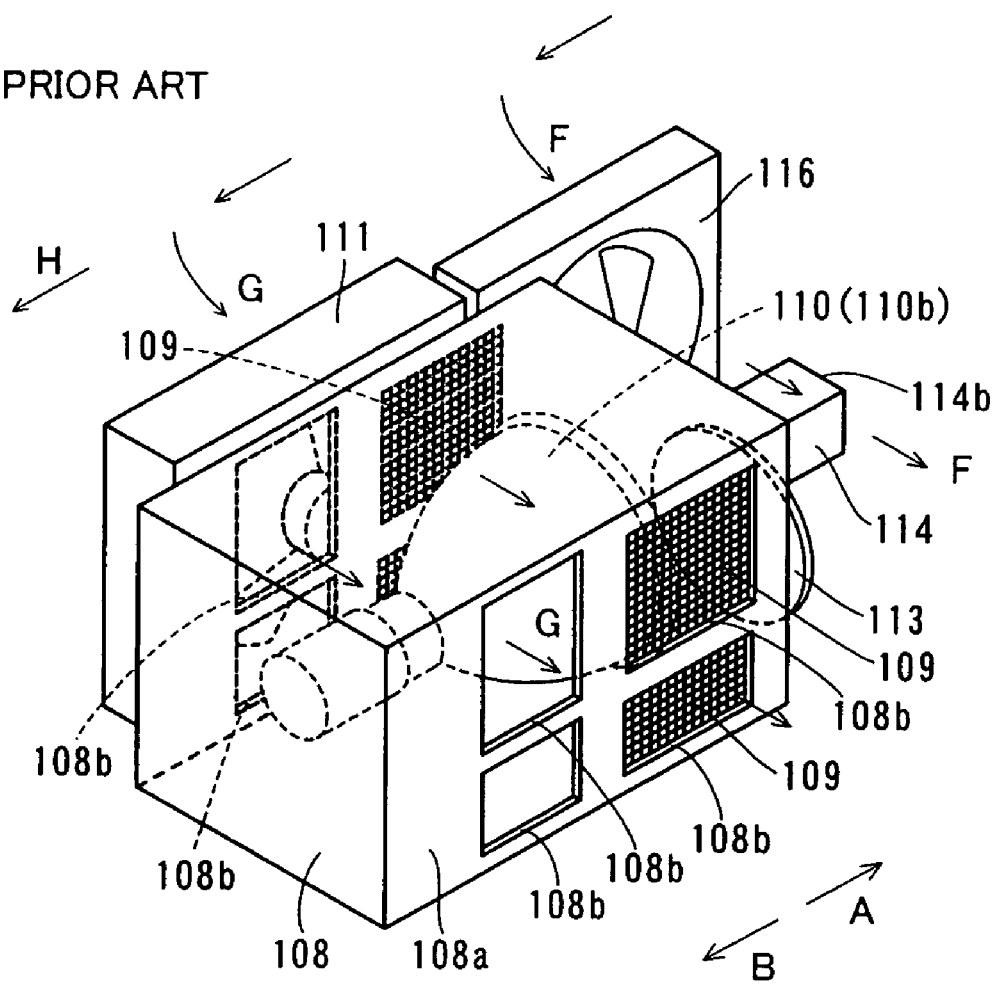
FIG. 9 is a perspective view of a source lamp and a temperature control fan of the conventional projector shown in FIG. 7.

According to this embodiment, the lamp case 12 encloses the source lamp 9 in order to prevent the source lamp 9 from leaking light (ultraviolet light), as shown in FIGS. 3 and 4. According to this embodiment, the lamp case 12 so encloses the source lamp 9 that fragments of the source lamp 9 can be inhibited from scattering outward even if the source lamp 9 arranged in the lamp case 12 is broken due to excessive temperature rise. Therefore, no protection nets may be provided on openings corresponding to the openings 108b of the conventional lamp case 108 dissimilarly to the conventional lamp case 108 (see FIG. 9), whereby the number of components can be reduced. A first side surface 12b of the lamp case 12 is provided with the air guide hole 12c for introducing the air fed through the outlet 4i of the air guide portion 4g of the duct 4e and the air guide hole 12d for discharging the air guided toward the back of the source lamp 9 from the lamp case 12. A second side surface 12e of the lamp case 12 is provided with the air guide hole 12f for introducing the air fed from the outlet 4m of the duct 4k. The air guide holes 12c, 12d and 12f are examples of the "first air guide hole", the "third air guide hole" and the "second air guide hole" in the present invention respectively.

As shown in FIG. 2, an engine chassis 13 of magnesium (Mg) is set in the lower frame 4. The color wheel 10 is rotatably arranged on a position of the engine chassis 13 condensing the light emitted from the bulb 9a of the source lamp 9. This color wheel 10 has a function of coloring the light emitted from the source lamp 9. The light tunnel 11 for rectangularly shaping the light is mounted on the color wheel 10 along arrow J. This light tunnel 11 is in the form of a tubular tetrahedron having an inlet 11a receiving the light from the source lamp 9 and an outlet 11b discharging the received light.

A transmission member 14 transmitting the light shaped by the light tunnel 11 is mounted on the engine chassis 13 on the side of the outlet 11b of the light tunnel 11. A mirror 15 for reflecting the light transmitted through the transmission member 14 is set on the engine chassis 13. A DMD 16 for further reflecting the light reflected by the mirror 15 and supplying the same to the projection lens 5 is provided on the outer side of the engine chassis 13. This DMD 16 has a large number of reflecting portions on the surface thereof for displacing these reflecting portions in response to a picture signal and forming images depending on presence/absence of reflected light. A lens 17 is provided between the DMD 16 and the mirror 15. This lens 17 has a function of condensing the light reflected by the mirror 15 to the reflecting portions of the DMD 16. The DMD 16 is mounted on a printed board 18 for controlling the same. A heat sink member 19 for releasing heat from the DMD 16 is mounted on the printed board 18. A main substrate 20 for controlling the projector is arranged on the lower frame 4.

Operations of the projector according to the embodiment of the present invention are now described with reference to FIG. 2. First, the light emitted from the bulb 9a of the source lamp 9 is condensed by the reflector 9b of the source lamp 9 and introduced into the inlet 11a of the light tunnel 11, as shown in FIG. 2. Thereafter the light introduced into the inlet 11a of the light tunnel 11 is rectangularly shaped, to outgo from the outlet 11b of the light tunnel 11. The light outgoing from the outlet 11b of the light tunnel 11 advances along arrow L and passes through the transmission member 14, to enter the mirror 15. The mirror 15 reflects this light along arrow M. The light reflected by the mirror 15 enters the DMD 16 through the lens 17. The DMD 16 reflects this light along arrow N, for supplying the same to the projection lens 5. Thus, the projection lens 5 projects images on a screen or the like.

In the aforementioned operations of the projector, the exhaust fan 6 and the plurality of vanes 8c of the blower 8 are so rotated as to introduce air through the intake ports 4a of the lower frame 4. First, the vanes 8c of the blower 8 are so rotated that part of the air introduced through the intake ports 4a advances along the partition 4d of the lower frame 4 (along arrow O in FIG. 2), and is guided to the air inlet 8a of the blower 8. The blower 8 feeds the air to the air guide hole 4f of the duct 4e of the lower frame 4 from the air outlet 8b. In this case, the air fed to the air guide hole 4f of the duct 4e is branched toward the source lamp 9 (along arrow P in FIG. 2) and toward the color wheel 10 and the light tunnel 11 (along arrow Q in FIG. 2) according to this embodiment.

The air guided toward the source lamp 9 is discharged from the outlet 4i of the air guide portion 4g of the duct 4e and guided into the lamp case 12 through the air guide hole 12c provided on the first side surface 12b of the lamp case 12. Thus, the air guided into the lamp case 12 advances along arrow R in FIG. 2 as hot air of about 100° C., while cooling the bulb 9a and the reflector 9b along the inner surface of the reflector 9b of the source lamp 9 mounted in the lamp case 12.

On the other hand, the air guided toward the color wheel 10 and the light tunnel 11 is discharged from the outlet 4j of the air guide portion 4h of the duct 4e, to advance along arrow Q in FIG. 2 while cooling the color wheel 10 and the light tunnel 11. The hot air of about 60° C. passing through the color wheel 10 and the light tunnel 11 is introduced into the air guide hole 4l of the duct 4k. Thus, the air passing through the duct 4k is discharged from the outlet 4m thereof and guided into the lamp case 12 through the air guide hole 12f of the second side surface 12e of the lamp case 12.

According to this embodiment, the air introduced into the lamp case 12 through the duct 4k is so fed as to guide the air fed from the blower 8 to the lamp case 12 through the air guide portion 4g of the duct 4e toward the back of the source lamp 9 (along arrow S in FIG. 2). Thus, the back portion of the source lamp 9 can be cooled.

The hot air of about 100° C. employed for cooling the source lamp 9 and the hot air of about 60° C. guided through the duct 4k are mixed with each other at the back of the source lamp 9, to form hot air of about 80° C. to about 85° C. advancing along arrow S in FIG. 2. The hot air advancing along arrow S in FIG. 2 is discharged from the lamp case 12 through the air guide hole 12d formed on the first side surface 12b of the lamp case 12. Consequently, the source lamp 9 is controlled to a prescribed temperature. The exhaust fan 6 arranged on the lower frame 4 discharges the air discharged through the lamp case 12 from the projector.

The exhaust fan 6 also discharges part of the air introduced through the intake ports 4a from the outlet 4b of the lower frame 4 through the main substrate 20 along arrows T and U in FIG. 2. Thus, the main substrate 20 is cooled.

According to this embodiment, as hereinabove described, the duct 4e for branching the air fed from the blower 8 toward the source lamp 9 and toward the color wheel 10 and the light tunnel 11 respectively is so provided that the air can be guided toward the source lamp 9 and toward the color wheel 10 and the light tunnel 11 respectively with the single blower 8. Thus, no individual blowers may be arranged for cooling the source lamp 9 as well as the color wheel 10 and the light tunnel 11 respectively, whereby the number of the blower 8 can be inhibited from increase when cooling the source lamp 9 as well as the color wheel 10 and the light tunnel 11 respectively.

According to this embodiment, the duct 4k for guiding the air guided toward the color wheel 10 and the light tunnel 11 to pass through the color wheel 10 and the light tunnel 11 toward the source lamp 9 is so provided that the air employed for cooling the color wheel 10 and the light tunnel 11 can be guided into the lamp case 12 storing the source lamp 9 again. Thus, the air employed for cooling the color wheel 10 and the light tunnel 11 can be recycled for efficiently cooling the source lamp 9.

According to this embodiment, the air guide hole 12c for introducing the air fed from the duct 4e and the air guide port 12f for introducing the air fed from the duct 4k are so formed on the lamp case 12 that the source lamp 9 can be cooled by introducing the air fed from the duct 4e through the air guide hole 12 and introducing the air fed from the duct 4k through the air guide hole 12f also when the temperature in the lamp case 12 enclosing the source lamp 9 is increased due to heat generation in the source lamp 9. In this case, a path for discharging the hot air increased in temperature by cooling the source lamp 9 can be ensured through the air guide hole 12d for discharging the air guided toward the back of the source lamp 9 from the lamp case 12. Consequently, the lamp case 12 storing the source lamp 9 can be inhibited from confining the heat therein.

According to this embodiment, the partition 4f for guiding the air to the blower 8 is so integrally provided on the lower frame 4 that the number of components can be inhibited from increase despite the provision of the partition 4f.

According to this embodiment, the duct 4e is integrally formed on the partition 4d integrally provided on the lower frame 4 and the duct 4k is integrally formed on the lower frame 4 so that the number of components can be inhibited from increase despite the provision of the ducts 4e and 4k.

Although the present invention has been described and illustrated in detail, it is clearly understood that the same is by way of illustration and example only and is not to be taken by way of limitation, the spirit and scope of the present invention being limited only by the terms of the appended claims.

For example, while the ducts 4e and 4k are integrally provided on the lower frame 4 (housing) in the aforementioned embodiment, the present invention is not restricted to this but the ducts 4e and 4k may alternatively be provided independently of the lower frame 4. Further alternatively, the duct 4e having a branch portion may be integrally formed on the partition 4d.

While the partition 4d is integrally provided on the lower frame 4 (housing) in the aforementioned embodiment, the present invention is not restricted to this but the partition 4d may alternatively be provided independently of the lower frame 4.

What is claimed is:

1. A projector comprising:
    a source lamp;
    an optical component arranged on a position irradiated with light from said source lamp;
    air feed means for feeding air toward said source lamp;
    a first air guide member for guiding said air fed from said air feed means at least toward said optical component; and
    a second air guide member for guiding said air guided toward said optical component to pass through said optical component toward said source lamp; and
    a lamp case mounted therein with said source lamp and formed to enclose said source lamp for preventing said source lamp from leaking light, wherein
    said first air guide member includes a first air guide portion for guiding said air fed from said air feed means to said source lamp and a second air guide portion branching from said first air guide portion for guiding said air fed from said air feed means to said optical component,
    said lamp case includes a first air guide hole for introducing said air fed from said first air guide portion of said first air guide member and a second air guide hole for introducing said air fed from said second air guide member, and
    said first air guide hole and said second air guide hole are provided on a first side surface and a second side surface opposed to each other through said source lamp of said lamp case, respectively.

2. The projector according to claim 1, wherein
    said air introduced into said source lamp by said second air guide member is so fed as to guide said air fed from said air feed means to said source lamp through said first air guide portion of said first air guide member toward the back of said source lamp.

3. The projector according to claim 1, wherein
    said lamp case further includes a third air guide hole for discharging said air guided toward the back of said light source from said lamp case.

4. The projector according to claim 3, wherein
    said first air guide portion of said first air guide member is connected to said first air guide hole of said lamp case, and
    said second air guide member is connected to said second air guide hole of said lamp case.

5. The projector according to claim 1, further comprising a housing, wherein
    said housing is integrally provided with a partition for guiding air to said air feed means,
    said first air guide member is integrally formed on said housing or said partition, and
    said second air guide member is integrally formed on said housing.

6. The projector according to claim 1, wherein
    said second air guide member includes an intake port for introducing said air passing through said optical component, and an inlet introducing said air received through said intake port into said source lamp.

7. The projector according to claim 1, wherein
    said source lamp includes a bulb and a reflecting member for reflecting and condensing light emitted from said bulb, and
    said first air guide portion of said first air guide member is arranged to guide said air fed by said first air guide portion along the inner surface of said reflecting member.

8. The projector according to claim 1, wherein
    said second air guide portion of said first air guide member includes an outlet for discharging said air fed from said air feed means,
    said second air guide member includes an intake port for introducing said air passing through said optical component, and
    said outlet of said second air guide portion of said first air guide member and said intake port of said second air guide member are opposed to each other through said optical component.

9. A projector comprising a housing of resin, a source lamp, an optical component arranged on a position irradiated with light from said source lamp, a blower for feeding air toward said source lamp and a lamp case mounted therein with said source lamp, wherein said housing is integrally formed with a partition for guiding air to said blower, a first duct for branching said air fed from said blower toward said source lamp and toward said optical component respectively and a second duct for guiding said air guided toward said optical component to pass through said optical component toward said source lamp, said first duct is integrally formed on said partition of said housing and includes a first air guide portion for guiding said air fed from said blower to said source lamp and a second air guide portion branching from said first air guide portion for guiding said air fed from said blower to said optical component, said air introduced into said source lamp through said second duct is so fed as to guide said air fed from said blower to said source lamp through said first air guide portion of said first duct toward the back of said source lamp, said lamp case is formed to enclose said source lamp for preventing said source lamp from leaking light, and includes a first air guide hole for introducing said air fed from said first air guide portion of said first duct, a second air guide hole for introducing said air fed from said second duct and a third air guide hole for discharging said air guided toward the back of said source lamp from said lamp case, and said first air guide hole and said second air guide hole are provided on a first side surface and a second side surface opposed to each other through said source lamp of said lamp case, respectively.

10. The projector according to claim 9, wherein said first air guide portion of said first duct is connected to said first air guide hole of said lamp case, and said second duct is connected to said second air guide hole of said lamp case.

11. The projector according to claim 9, wherein said second duct includes an intake port for introducing said air passing through said optical component and an inlet introducing said air received through said intake port into said source lamp.

12. The projector according to claim 9 wherein said source lamp includes a bulb and a reflecting member for reflecting and condensing light emitted from said bulb, and said first air guide portion of said first duct is arranged to guide said air fed by said first air guide portion along the inner surface of said reflecting member.

13. The projector according to claim 9, wherein said second air guide portion of said first duct includes an outlet for discharging said air fed from said blower, said second duct includes an intake port for introducing said air passing through said optical component, and said outlet of said second air guide portion of said first duct and said intake port of said second duct are opposed to each other through said optical component.

* * * * *